Jan. 8, 1935.  F. H. DRAKE  1,987,588
ALTIMETER
Filed Jan. 30, 1930  2 Sheets-Sheet 1
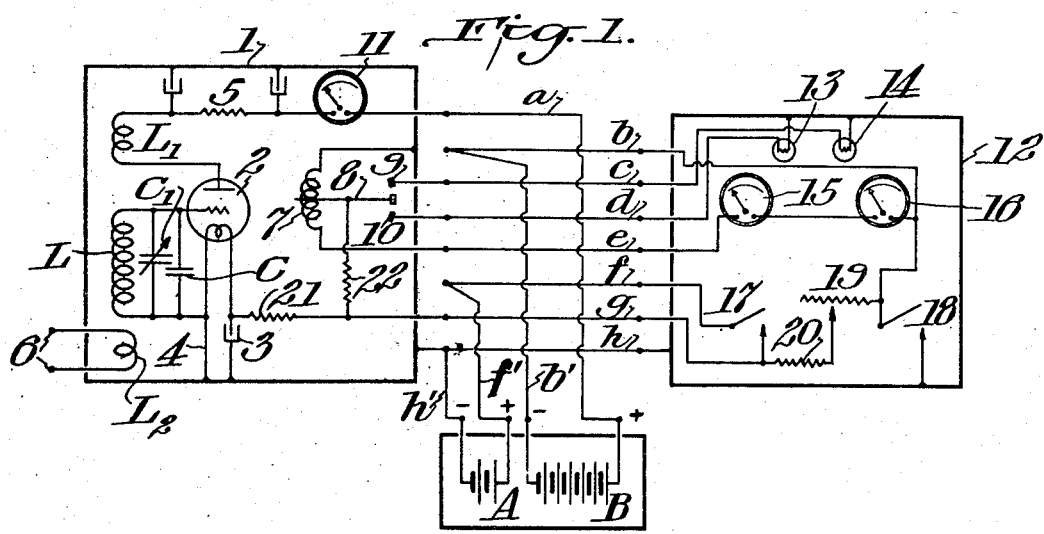

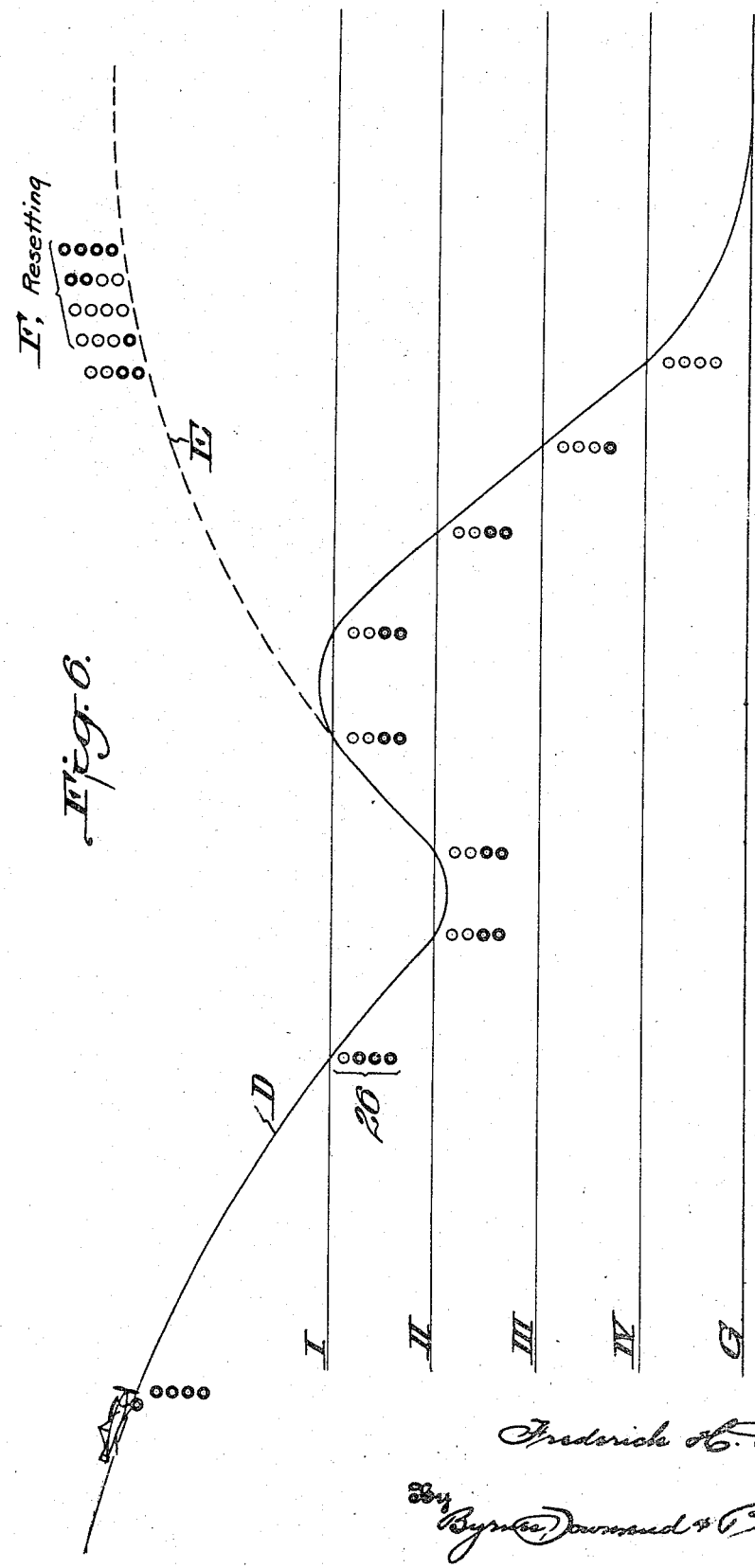

Patented Jan. 8, 1935

1,987,588

UNITED STATES PATENT OFFICE 1,987,588

ALTIMETER

Frederick H. Drake, Boonton, N. J., assignor, by mesne assignments, to Radio Corporation of America, New York, N. Y., a corporation of Delaware Application January 30, 1930, Serial No. 424,667

13 Claims. (Cl. 250—1)

This invention relates to electrical apparatus for the measurement of distances, and more particularly to apparatus for determining the distance between a source of electrical wave energy and a reflecting surface.

In my copending application, Ser. No. 247,190, filed Jan. 16, 1928, I have described the method of and apparatus for determining distances by radiating electrical energy of definite wave length from a source, and determining the distance between the source and reflecting surface by the reaction upon the source of wave energy returned thereto by reflection from the reflecting surface.

The present invention relates to apparatus of the same general character, and an object of the invention is to provide apparatus including relays for actuating signals when the distance between the source and reflecting surface reaches definite and predetermined values. Other objects are to provide improved electrical and mechanical arrangements of the elements of the apparatus which will facilitate the construction of compact devices that may be conveniently installed in aeroplanes or the like where space and weight requirements are particularly rigid. A further object is to provide apparatus of the type stated including a generating unit and an indicating unit that may be located in any convenient positions and operatively connected by a multistrand cable.

These and other objects of the invention will be apparent from the following specification when taken with the accompanying drawings in which:

Fig. 1 is a diagrammatic view of the electrical circuits of one embodiment of the invention, Fig. 2 is a view of another embodiment of the invention, the generating unit being shown in front elevation, and the indicating unit being shown diagrammatically.

Fig. 3 is a front elevation of the indicating unit shown in Fig. 1,

Fig. 4 is a front elevation of the indicating unit shown in Fig. 2,

Fig. 5 is a perspective view, on an enlarged scale, of one of the circuit-controlling elements of the indicating unit shown in Fig. 2, and Fig. 6 is an explanatory diagram illustrating the operation of the indicating unit of Figs. 2 and 4.

In the drawings, the reference numeral 1 identifies the shielded housing of the generating unit which includes the vacuum tube 2 having coupled grid and plate inductances L, $L_1$, respectively.

The cathode circuit of the tube is grounded upon the housing 1 by a condenser 3 and, when the cathode is of the filamentary type, one terminal of the cathode is conductively connected to the housing by a lead 4. The filter mesh 5 in the plate circuit completes the oscillatory circuits of the vacuum tube independent of the plate battery. The inductance L of the grid circuit may be shunted by a fixed capacity C and by a condenser $C_1$ that may be adjusted for tuning the oscillator to different wave lengths. The inductance $L_2$ is coupled to the grid inductance L and has terminals 6 to which the antenna, not shown, may be connected.

The generating unit also includes a relay of the double contact type, the current through the winding 7 determining the position of the contact arm 8 that is movable between the fixed contacts 9, 10. A milliammeter 11 in the plate circuit of the oscillator may be, and preferably is, carried by the generating unit.

The circuits of the generating unit will best be understood by first considering the indicating unit which comprises a casing 12 which carries signal devices such as lamps, 13, 14, respectively, and current measuring instruments 15, 16, respectively. The indicating unit also includes a pair of switches 17, 18, respectively, an adjustable resistance 19 and preferably a current-limiting resistance 20. All of the circuits of the generating and indicating units may be energized from the cathode battery A and the plate or high tension battery B by means of a multistrand cable which includes leads connected to the terminals of the respective batteries and a plurality of leads for completing the electrical circuits between elements of the generating unit and elements of the indicating unit.

The cable is of course of such length that the respective units may be located in any desired or convenient positions, and the cable terminates in plug connectors for cooperation with socket terminals on the units. As shown in Fig. 1, the socket on the generating unit has eight terminals while the socket on the indicating unit has but seven terminals and the main cable extending between the two units comprises seven strands indicated by the letters b to h, inclusive. The strand a of the cable does not extend between the two units but connects the high potential side of the plate battery B to the generating unit terminal of the plate circuit. Strand b' of the battery section of the cable is connected to strand b that extends to the junction of one terminal of the instrument 16 and the resistance 19 of the indicating unit. Strands c and d extend between relay contacts 9, 10 and the signal lamps 13, 14, respectively, the second terminal of each lamp filament being grounded on the casing 12. One terminal of relay winding 7 is grounded on the casing 1 and the strand e of the cable connects the second terminal of the relay winding 7 to a terminal of the instrument 15, this circuit continuing through the second instrument 16 to the strand b. The strand f' of the battery section is connected to strand f of the connecting cable which leads to the contact arm of switch 17 of the indicating unit but which is not connected to any element of the generator unit. The strand g connects the fixed contact of switch 17 to the cathode of the vacuum tube 2 through the resistance 21 that is mounted in the generating unit. The strand h' of the battery cable connects with the strand h that is grounded upon the generating unit housing 1 and the indicating unit casing 12.

The contact arm 8 of the relay is connected to the high potential lead of the cathode battery through a current-limiting resistance 22. The contact switch 18 is grounded on the casing 12 of the indicating unit and the movable contact is connected to that terminal of resistance 19 to which the strand b is connected.

An examination of the circuits will show that when switches 17 and 18 are both closed, the cathode heating circuit is completed through f', f, switch 17, g, resistance 21, the tube filament, lead 4 and strand h', and the plate circuit is completed through battery strand a, b', b, switch 18, strand h and lead 4. When switch 18 is closed, the indicating system is shunted and the oscillator may be adjusted for best operation in the usual manner.

When the shunt switch 18 is opened, the relay winding 7 and the instruments 15 and 16 are serially connected unshunted between the low potential side of the plate battery and the grounded filament terminal of the tube. When the contact arm 8 engages contact 9 or 10, it completes a circuit for energizing the lamp 13 or 14, respectively, from the cathode battery A.

Assuming the apparatus to be mounted upon an aeroplane and radiating electrical wave energy from the antenna connected to terminals 6, the operation is as follows. As the plane approaches the ground, the reflection back to the oscillator of a portion of the energy radiated therefrom will produce reactions that are characterized by alternate maxima and minima of oscillatory current flow when the plane reaches levels spaced from the ground surfaces by multiples of one-quarter the length of the radiating wave. When the plane is at such elevation that the effects of this reflected wave energy are substantially zero, the resistance 19 is so adjusted by dial 19', Fig. 3, that the normal plate current in relay winding 7 and instruments 15, 16 is just neutralized by current flowing from the cathode battery A through the current-limiting resistance 20 and the adjustable resistance 19. This condition of neutralization of normal plate current flow is obtained when instruments 15 and 16 both indicate zero current. These instruments are oppositely connected in the plate circuit of the tube 2 and therefore one instrument will indicate positive changes in plate current flow, while the other instrument indicates negative changes. As the plane passes through levels corresponding to altitudes equal to multiples of the one-quarter wave length, the plate current alternately rises to a maximum and falls to a minimum. Since the normal plate current was neutralized, these changes in plate current are indicated by the instruments 15, 16 and the contact arm 8 of the relay moves alternately towards the contacts 9 and 10. The sensitivity of the relay may be so adjusted that the signal circuits will be closed only at two chosen levels above the ground. The passing of other maxima and minima levels may be noted from observation of the instruments but the passing of the last two significant levels will be indicated by the lighting of the signal lamp 13 and the signal lamp 14.

I have discovered that when the signals take the form of signal lamps, the heavy rush of current at the instant that the relay contacts are closed will cause the contacts to stick. The current-limiting device 22 is so chosen that the initial surge of current, before the lamp filaments are heated, is held to a value which will not cause sticking. A choke coil may be used for this purpose but a resistance is usually equally effective and more convenient. For example, with lamps having a cold resistance of some 6 or 7 ohms and a hot resistance of about 30 ohms, I have found that the current-limiting device 22 may take the form of an ordinary wire resistance of 15 ohms to prevent sticking contacts in a commercial high-sensitivity relay.

The apparatus shown in Fig. 2 differs from that illustrated diagrammatically in Fig. 1 only as to the construction of the indicating unit. Only the front panel of the generating unit is shown at the left side of Fig. 2, but it is to be understood that the circuit arrangement is or may be substantially the same as that shown diagrammatically in Fig. 1.

The switches 17, 18 and the resistances 19, 20, in this embodiment may be identical with those previously described and their connections to the cable and to the elements of the generating unit are also identical with those previously described. In this form, the separate milliammeters 15 and 16 are replaced by a single instrument 15' that indicates the direction as well as the magnitude of current flow. In this embodiment, however, the secondary circuits of the relay do not include the signal lamps but include elements for controlling the signal system. The strands c and d of the cable extend between the relay contacts and the solenoids 23, 24, respectively, that have as their common armature the arm 25 of the lever of a Geneva escapement. As the current flow in the relay winding 7 passes through successive maxima and minima, the escapement lever will be rocked back and forth to permit the step-by-step movement of a rotary switch.

For the particular signal system shown in Figs. 2 and 4, the rotary switch will operate on a cycle of six steps. Attention is directed to the fact that the cylindrical surface of the switch drum that is shown in the diagrammatic view, Fig. 2, represents what may be considered a development of that portion of the cylindrical surface which corresponds to the six steps of one cycle. One terminal of each of a series of signal lamps 26 is connected to the fixed contact of switch 17 and therefore to the high potential side of cathode battery A when the switch is closed. The other terminals of the respective lamps 26 are connected to individual brushes or contacts 27 that engage the surface of the cylindrical switch drum 28. In the first position of the rotary switch, none of the contacts 27 engages the conductive segment 29 that is grounded on the casing 12' by a lead 30. The forward edge of the segment 29 is cut away to effect the successive closing of the respective lamp circuits as the switch is given a step-by-step rotation. The circumferential lengths of those portions of the conducting segment 29 that cooperate with the several lamps are preferably such that none of the lamps is extinguished as succeeding lamps are energized.

To prevent the inadvertent lighting of subsequent signals if the distance being measured should increase after it had passed through a value or values corresponding to the lighting of some of the series of lamps, means is provided for decreasing the sensitivity of the relay. As previously described, the closing of the switch 18 will shunt the indicating circuits, and the system for automatically decreasing the sensitivity of the relay preferably comprises a series of resistive shunt circuits that are effectively in parallel with the shunt switch 18. As shown in Fig. 2, one terminal of the plurality of resistances 31, 32, is connected to the movable arm of switch 18 and the other terminals of the resistance are connected to individual contacts 33 that are so positioned with reference to the contour of the contacting segment 29 of the switch drum that the resistive shunt circuits are progressively closed after the first lamp is energized.

Simultaneously with the shunting of the relay winding 7 by the resistances 31 or 32, it is essential that a second resistance be included in series with the shunted winding 7 to maintain the effective series resistance of the relay constant. If this is not done, the "zero" adjustment of the relays, as established by the current introduced from battery A through resistance 19, will be disturbed. Between the second terminal of the instrument 15' and the connecting strand e, there are introduced two series resistances 34, 35 and leads 36, 37, 38 extend from the terminals of these resistances to contacts that engage the split ring 39 on the rotating switch drum 28. As shown in the detail view, Fig. 5, the ring 39 has one gap 40 that, in certain positions of the drum, lies between the contacts associated with adjacent leads 36, 37 or 37, 38, and a second gap 40' which is so positioned that it lies under and is spanned by the respective contacts in three different adjustments of the drum.

As shown in Fig. 2, the gap 40 is in such position with reference to the three contacts that it will break the shunt circuit around the resistance 34 when the drum has advanced two steps. This position of the drum therefore shunts resistance 31 across the relay winding 7 and includes the resistance 34 in series with the shunted winding.

The series of lamps 26 are preferably arranged in a vertical column on the panel of the casing 12' and adjacent a scale or indicator card 41 that carries notations, opposite the respective lamps, of the elevation at which the several lamps will be lighted. The contact cylinder or drum 28 is rotated by a coil spring 42, the winding key 43 for the spring preferably extending through the front panel of the casing 12'.

The operation of this form of indicating unit will be described in connection with the diagram constituting Fig. 6. In this diagram, the series of lines I to IV, inclusive, indicate levels separated from each other and from the ground line G by one-quarter wave length. When the plane is at such elevation that the effects of reflected wave energy are substantially zero, the adjustable resistance 19 is set, by dial 19', to bring the pointer of instrument 15' to zero, and, if necessary, the apparatus is re-set to extinguish all lamps. As the plane reaches the elevation of the plane I, the current flow through the relay closes one set of contacts to energize the solenoid 24, Fig. 2, and the spring 42 turns the switch drum 28 to close the circuit through the first light. As the plane continues along the descending portion of its path, indicated by the solid line D, the current corresponding to the peak value at the second significant level, line II, closes the other set of relay contacts and the escapement permits the spring 42 to move the drum forward one step to close the circuit through the second lamp 26. At the same time, the contact associated with the resistance 31 is engaged by the segment 29 of the drum switch. When this resistive shunt circuit is closed, the plate current passes through the series resistance 34 and then divides and only a portion flows through the winding 7 of the relay, the sensitivity of the relay being reduced to such extent that the recurrence of the current peak corresponding to the level at line I will not close the contacts. If the altitude should increase after the plane has fallen below the level of line II, the repetition of the closing of the relay contacts that effected the previous release of the escapement can not give a false indication since the escapement lever must swing in the opposite direction to permit a further rotation of the drum. Due to the resistive shunt 31, the relay can not close the contacts when the plane rises above or again drops through the level of line I. As indicated by the series of light line and heavy line circles in Fig. 6, the upper lamps will light when the plane passes through the first significant level and the second lamp will light as the plane passes the second level, but the subsequent passage through one or both of these levels will not result in the lighting of additional lamps.

The repeated passing of a significant level will be indicated on instrument 15' by repeated readings corresponding to the current peak for that level, and a continued zero reading of the instrument usually indicates that the plane has risen above the altitude at which the effects of reflected energy disappear.

The current peak corresponding to level III is in the same sense as the current peak for level I but is of substantially greater magnitude. Although the relay was rendered less sensitive by the resistive shunt 31, the current flow corresponding to level III is sufficient to again close the relay contacts that energize the solenoid 24 and the cylinder is therefore rotated an additional step to close the third lamp of the series. This movement of the switch closes the second resistive shunt 32 and inserts the series resistance 35, but the current peak for level IV is of such magnitude that the second set of relay contacts is closed as the plane passes through that level. The lighting of the complete series of lamps indicates to the pilot that he has fallen through a certain range of altitude and is within a definite selected distance of the earth's surface. For resetting the altimeter when flight is resumed, or to reset the altimeter after one or more lamp circuits have been closed and the plane takes an ascending path such as indicated by the broken line E, the operator adjusts the value of the resistance 19 to establish current peaks similar to those produced by reflected wave energy. Assuming that the plane followed line E after two of the lamps were lighted, the sequence of lamp operation incident to the resetting of the altimeter is indicated diagrammatically by the several columns of circles which are grouped within the bracket F. By appropriate manipulation of the adjusting dial 19' of the resistance 19, the operator may simulate the occurrence of the current peaks which correspond to the levels III and IV. As the dial of resistance 19 is manually operated in this manner, the first step will light the third lamp of the series and the second step will light the fourth lamp, thus reproducing the condition corresponding to the landing of the plane. Upon adjusting resistance 19 to effect the next step in the cycle, the circuit through the upper lamps is broken and only the two lower lamps remain lighted. Adjusting the resistance 19 in the opposite sense effects the final step in the cycle and all of the lamps are extinguished. The value of resistance 19 is then so adjusted that the pointer of instrument 15' is at zero, thus resetting the apparatus for further use.

While I have shown a series of four lamps, it will be understood that a greater or less number may be employed and that the fifth or resetting step will not be necessary if an odd number of lamps are employed. For use as an altimeter on an aeroplane or the like, the signal devices do preferably take the form of lamps, but it will be apparent that other signals such as buzzers, bells or the like may be energized by the relay. When the apparatus is employed on the ground for detecting the presence of an aeroplane above the oscillator, the relay and switch may successively close signal light circuits and flood light circuits at the landing field.

The physical arrangement of the generating unit, the indicating unit and the parts thereof may of course be varied within wide limits to adapt the distance measuring apparatus for any particular or desired use. For use on aeroplanes, the two units and connecting cable are particularly advantageous, since only the indicating unit need be mounted near the operator, but where economy of space is not important, all of the parts may be contained within a single cabinet.

While I have illustrated the generator of electrical wave energy as a simple oscillator employing but one tube, it will be apparent that the oscillator may take the form of a master oscillator and an amplifier tube or tubes. In such an arrangement, the relay winding will be included in a circuit of one of the amplifier tubes that constitutes a part of the complete vacuum tube generator.

It will be apparent that the invention is not limited to the particular embodiments which are herein illustrated and described, since the above and other changes in the several parts, their relative construction and arrangement may be made without departing from the spirit of my invention as set forth in the following claims.

I claim:

1. In an altimeter of the reflected wave energy type, the combination with a source of electrical waves, a radiator for radiating wave energy into space, and a relay having the solenoid thereof in a circuit of said source in which alternately occurring maxima and minima reaction effects are produced by energy returned to the source from a reflecting surface as the distance between said source and surface is progressively decreased, said relay having a contact arm movable into engagement with one or the other of two contacts as the maxima and minima effects respectively reach predetermined values, of a plurality of signal devices, and means including circuits controlled by said relay arm and contacts for selectively energizing said devices to produce at least three different signals corresponding respectively to three different distances between said source and surface.

2. In distance measuring apparatus of the reflected wave energy type, the combination with a vacuum tube oscillator which may be connected to radiating means, sources of current for energizing said tube, and a relay having its solenoid included in a circuit which forms a path for the space current of said oscillator tube, of indicating apparatus comprising current measuring means in a space current path of said oscillator for indicating the alternately occurring maxima and minima effects produced by that portion of radiated wave energy which is reflected back to said oscillator as the distance between the source and a reflecting surface is progressively decreased, signal devices in the secondary circuit of said relay, and means for adjusting the relay so that the signal devices are alternately energized when the distance between said oscillator and a reflecting surface reaches predetermined values corresponding to maxima and to minima effects of reflected wave energy.

3. The invention as set forth in claim 2, wherein said current measuring means includes two ammeters oppositely connected in series with each other and with the winding of said relay, whereby one ammeter indicates the magnitude of maxima effects and the second ammeter indicates the magnitude of minima effects of returned wave energy upon the current flow in the oscillator circuit which includes said relay.

4. In an altimeter or the like, the combination with a vacuum tube oscillator and a relay for alternatively closing two sets of contacts when the current flow in a circuit of said oscillator passes through a series of predetermined values, of a series of signal devices, circuit elements including said relay contacts for progressively energizing said signal devices as the current flow in said circuit passes through said series of values, and means preventing the inadvertent energizing of a subsequent signal device when the current reaches for a second time the value which effected the energizing of a previous signal device.

5. The invention as set forth in claim 4, in combination with manually operated means for de-energizing the energized signal devices to reset the apparatus.

6. In a device of the type stated, the combination with a relay including a contact arm movable between a pair of contacts, of a series of signal devices and switch means actuated by the alternate engagement of said contact arm with the respective contacts for progressively energizing said signal devices when the current flow through said relay alternately varies in opposite sense by progressively increasing increments.

7. The invention as set forth in claim 6, wherein said signal devices comprise lamps, in combination with means in series therewith to limit the initial current flow prior to the heating of the lamp filaments.

8. In a device of the type stated, the combination with an oscillator, a relay having the winding thereof included in a circuit which forms a path for the space current of said oscillator, said relay having a contact arm movable between and adapted to engage the respective contacts of a pair of contacts when the current through said winding rises to a predetermined maximum or falls below a predetermined minimum, of a series of signal devices, and switch means for progressively energizing said signal devices as the current flow in said circuit varies from a mean value corresponding to neutral position of said relay contact arm by alternately occurring positive and negative increments of progressively increasing magnitude.

9. The invention as set forth in claim 8 in combination with means establishing a resistive shunt around said relay winding when said switch means is actuated to energize a given signal device, whereby the sensitivity of the relay is reduced.

10. In distance measuring apparatus of the reflected wave energy type, the combination with an oscillator and a relay responsive to changes in current flow due to the reaction upon said oscillator of wave energy reflected back to the same, of a plurality of signal devices, switch means for completing circuits to energize said signal devices progressively, and means controlled by said relay for effecting the actuation of said switch means.

11. The invention as set forth in claim 10, wherein said switch means comprises a rotatable cylinder having a conducting segment at the cylindrical surface thereof, and fixed contacts for engaging said segment at predetermined angular adjustments of said cylinder; and said relay-controlled means comprises a spring tending to rotate said cylinder, an escapement normally locking said cylinder against rotation, and electro-magnetic means for actuating said escapement upon the closure of the relay circuit.

12. A device for determining the distance between an aeroplane and a reflecting surface comprising, a distance measuring device located on said plane including a thermionic tube with input and output electrodes coupled in alternating current circuits to produce sustained oscillations, means for coupling an antenna system to said circuits to radiate energy towards said reflecting surface and to receive energy from said reflecting surface, direct current energizing circuits connected between the electrodes of said tubes, a relay including a winding in series with one of said direct current energizing circuits, said relay having a movable armature, a plurality of indicating devices, a plurality of contacts located adjacent said movable armature, and circuits cooperating with said contacts and with said indicating devices for energizing said indicating devices when said armature is actuated by energizing current flowing through said energizing circuits including said relay winding to close said contacts.

13. A device for determining the distance between an aeroplane and a reflecting surface comprising, a distance measuring device located on said plane including a thermionic tube with input and output electrodes coupled in alternating current circuits to produce sustained oscillations, means for coupling an antenna system to said circuits to radiate energy towards said reflecting surface and to receive energy from said reflecting surface, direct current energizing circuits connected between the electrodes of said tubes, a relay including a winding in series with one of said direct current energizing circuits, said relay having a movable armature, a series of indicating devices, energizing circuits for each of said indicating devices, said circuits each including a switch comprising conducting elements located on a movable element and fixed contacts in the path of movement of said member, and means for progressively closing said switches and energizing said indicating devices as the current intensity in said relay winding rises and falls due to the effect of reflected energy on the oscillations produced in said oscillator including, a plurality of contacts located adjacent the armature of said relay, and a second relay adapted when energized to move said contact carrying movable member, said last named relay being energized by circuits closed by movement of said armature in response to current flowing in said winding of said first named relay.

FREDERICK H. DRAKE.